US012764795B2

(12) United States Patent
Davydov et al.

(10) Patent No.: US 12,764,795 B2
(45) Date of Patent: Oct. 13, 2026

(54) COMMUNICATION METHOD AND DEVICE IMPLEMENTING A NETWORK COMMUNICATION PROCEDURE WITH EARLY CHANNEL STATE INFORMATION ACQUISITION

(71) Applicant: Samsung Electronics Co., Ltd., Suwon-si (KR)

(72) Inventors: Alexei Vladimirovich Davydov, Saratov (RU); Dmitry Sergeyevich Dikarev, Saratov (RU); Gregory Aleksandrovich Ermolaev, Saratov (RU); Gregory Vladimirovich Morozov, Saratov (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/471,788

(22) Filed: Sep. 21, 2023

(65) Prior Publication Data

US 2024/0267954 A1 Aug. 8, 2024

(30) Foreign Application Priority Data

Feb. 2, 2023 (RU) ........................... RU2023102360

(51) Int. Cl.
*H04W 74/0833* (2024.01)
*H04L 5/00* (2006.01)
*H04W 74/00* (2009.01)

(52) U.S. Cl.
CPC ....... *H04W 74/0833* (2013.01); *H04L 5/0051* (2013.01); *H04W 74/006* (2013.01)

(58) Field of Classification Search
CPC ............ H04W 74/0833; H04W 74/006; H04L 5/0051; H04L 5/0048
See application file for complete search history.

(56) References Cited

U.S. PATENT DOCUMENTS 7,248,841 B2 7/2007 Agee et al.
7,864,725 B2 1/2011 Li et al.
(Continued)

FOREIGN PATENT DOCUMENTS

CN 107046704 A 8/2017
CN 107431595 B 6/2020
(Continued)

OTHER PUBLICATIONS

International Search Report dated Dec. 26, 2023, issued in International Application No. PCT/KR2023/014242.
(Continued)

*Primary Examiner* — Edan Orgad
*Assistant Examiner* — Samuel Roberge Bettendorf
(74) *Attorney, Agent, or Firm* — Jefferson IP Law, LLP

(57) ABSTRACT

The disclosure relates to a 5G communication system or a 6G communication system for supporting higher data rates beyond a 4G communication system such as long term evolution (LTE). A communication method performed by a user equipment (UE) during a network communication procedure is provided. The communication method includes transmitting a random access preamble, receiving a modified random access response (RAR) comprising a sounding reference signal (SRS) request field whose value indicates whether the UE should transmit the SRS, when the SRS request field value indicates that the UE should transmit the SRS, transmitting the SRS, and receiving one or multiple subsequent downlink (DL) transmissions with adaptive spatial signal processing performed on the basis of a channel state information (CSI) acquired on the basis of measurements of the SRS.

12 Claims, 17 Drawing Sheets

(56) References Cited

U.S. PATENT DOCUMENTS

| | | | |
|---|---|---|---|
| 9,847,862 | B2 | 12/2017 | Soriaga et al. |
| 9,948,439 | B2 | 4/2018 | Kwak et al. |
| 10,455,608 | B2 | 10/2019 | Shepard et al. |
| 10,701,617 | B2 | 6/2020 | Choi |
| 11,057,927 | B2 | 7/2021 | Shepard et al. |
| 11,088,744 | B1 | 8/2021 | Hammond et al. |
| 11,324,018 | B2 | 5/2022 | Chen et al. |
| 11,368,978 | B2 | 6/2022 | Amuru et al. |
| 2004/0095907 | A1 | 5/2004 | Agee et al. |
| 2008/0304551 | A1 | 12/2008 | Li et al. |
| 2013/0077571 | A1* | 3/2013 | Papasakellariou .. H04W 52/146 370/328 |
| 2013/0322280 | A1 | 12/2013 | Pi |
| 2014/0056251 | A1* | 2/2014 | Ahn .................... H04W 52/146 370/329 |
| 2014/0112220 | A1 | 4/2014 | Kwak et al. |
| 2016/0269157 | A1 | 9/2016 | Soriaga et al. |
| 2017/0048782 | A1 | 2/2017 | Choi |
| 2018/0338321 | A1 | 11/2018 | Shepard et al. |
| 2020/0029357 | A1 | 1/2020 | Shepard et al. |
| 2020/0228377 | A1 | 7/2020 | Papasakellariou |
| 2020/0367264 | A1 | 11/2020 | Chen et al. |
| 2021/0100026 | A1 | 4/2021 | Yoshimura et al. |
| 2021/0126816 | A1 | 4/2021 | Davydov et al. |
| 2021/0250071 | A1 | 8/2021 | Hammond et al. |
| 2021/0250149 | A1 | 8/2021 | Muruganathan et al. |
| 2022/0029764 | A1* | 1/2022 | Liou ..................... H04L 5/0094 |
| 2022/0046433 | A1 | 2/2022 | Bedekar et al. |
| 2022/0124821 | A1* | 4/2022 | Taherzadeh Boroujeni ................ H04L 5/0048 |
| 2022/0240306 | A1* | 7/2022 | Landis ................. H04B 7/0404 |
| 2023/0217375 | A1* | 7/2023 | Sung ................... H04W 52/243 455/522 |

FOREIGN PATENT DOCUMENTS

| | | | |
|---|---|---|---|
| CN | 113258973 | A | 8/2021 |
| CN | 107046704 | B | 9/2021 |
| CN | 113475157 | A | 10/2021 |
| CN | 108243627 | B | 8/2022 |
| EP | 3 272 053 | B1 | 9/2020 |
| EP | 3 945 689 | A1 | 2/2022 |
| WO | 2005/074166 | A1 | 8/2005 |
| WO | 2014/065600 | A1 | 5/2014 |
| WO | 2016/172652 | A1 | 10/2016 |
| WO | 2017/095467 | A1 | 6/2017 |
| WO | 2020/131128 | A1 | 6/2020 |
| WO | 2022/030948 | A1 | 2/2022 |

OTHER PUBLICATIONS

"3rd Generation Partnership Project; Technical Specification Group Radio Access Network; NR; Physical layer procedures for control (Release 17)", 3GPP TS 38.213, V17.3.0 (Sep. 2022), Specification # 38.213 (3gpp.org), Sep. 21, 2022.

Extended European Search Report dated Mar. 23, 2026, issued in European Application No. 23920106.4.

* cited by examiner

Modified Random Access Response (RAR, Msg2) to a random access preamble

Modified Random Access Response (RAR, Msg2) to a random access preamble

COMMUNICATION METHOD AND DEVICE IMPLEMENTING A NETWORK COMMUNICATION PROCEDURE WITH EARLY CHANNEL STATE INFORMATION ACQUISITION

CROSS-REFERENCE TO RELATED APPLICATION(S)

This application is based on and claims priority under 35 U.S.C. § 119(a) of a Russian patent application number 2023102360, filed on Feb. 2, 2023, in the Russian Intellectual Property Office, the disclosure of which is incorporated by reference herein in its entirety.

BACKGROUND

1. Field

The disclosure relates to communication systems. More particularly, the disclosure relates to communication methods and devices implementing a network communication procedure (e.g., an Initial Access (IA) procedure) with early Channel State Information (CSI) acquisition.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 gigahertz (GHz) to 3 terahertz (THz) bands). It is expected that, due to severer path loss and atmospheric absorption in the terahertz bands than those in millimeter wave (mmWave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems, a full-duplex technology for enabling an uplink transmission and a downlink (DL) transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to addresses at least above-mentioned problems and/or disadvantages and to provide at least the advantages described below. Accordingly, an aspect of the disclosure is to provide earlier CSI acquisition, i.e. the CSI acquisition during an initial network communication procedure, the non-limiting examples of which include an IA procedure, a handover procedure, a radio link failure recovery procedure, or a beam failure detection and recovery procedure. These procedures are known from related art. The earlier CSI acquisition is implemented by at least using a modified (enhanced) Random Access Response (RAR) to a random access preamble, the response including at least a further Sounding Reference Signal (SRS) request field whose value indicates whether a UE should transmit the SRS.

Additional aspects will be set forth in part in the description which follows and, in part, will be apparent from the description, or may be learned by practice of the presented embodiments.

In accordance with an aspect of the disclosure, a communication method performed by a UE during a network communication procedure is provided. The communication method includes transmitting a random access preamble within a Physical Random Access Channel (PRACH), receiving, within a Physical Downlink Shared Channel (PDSCH), a random access response (RAR) including a SRS request field whose value indicates whether the UE should transmit the SRS, when the SRS request field value indicates that the UE should transmit the SRS, transmitting the SRS, and receiving one or multiple subsequent DL transmissions with adaptive spatial signal processing performed on the basis of a CSI acquired on the basis of measurements of the SRS.

In accordance with another aspect of the disclosure, a UE which is configured to perform the communication method according to the first aspect of the disclosure or according to any further implementation of the first aspect of the disclosure is provided.

In accordance with another aspect of the disclosure, a communication method performed by a BS during a network communication procedure is provided. The communication method includes receiving from a UE a random access preamble within a PRACH, transmitting, within a PDSCH, a RAR message includes a SRS request field whose value indicates whether the UE should transmit the SRS, when the SRS request field value indicates that the UE should transmit the SRS, receiving the SRS, and receiving one or multiple subsequent DL transmissions with adaptive spatial signal processing performed on the basis of a CSI acquired on the basis of measurements of the received SRS.

In accordance with another aspect of the disclosure, a BS communicating in a communication network and configured to perform the communication method according to the third aspect of the disclosure or according to any further implementation of the third aspect of the disclosure is provided.

In accordance with another aspect of the disclosure, a communication system is provided. The communication system includes a plurality of UEs according to the second aspect of the disclosure or according to any further implementation of the second aspect of the disclosure and a plurality of BSs according to the fourth aspect of the disclosure or according to any further implementation of the fourth aspect of the disclosure, wherein said plurality of UEs and said plurality of BSs are configured to communicate with each other in this communication system.

Due to the above features of the disclosure, the communication between the devices being in a communication network (e.g., BS and UE) can be performed in optimal manner earlier than in the related art (see FIG. 1 (related art) and FIG. 2 (disclosure)). Thus, due to the disclosure, the communication efficiency between the devices being in the communication network is improved because the communication with the high SNR (due to digital precoding), with spatial multiplexing, without unnecessary interference to UEs served by other BSs, and with high spectral efficiency is implemented earlier than in the solutions known from the related art.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
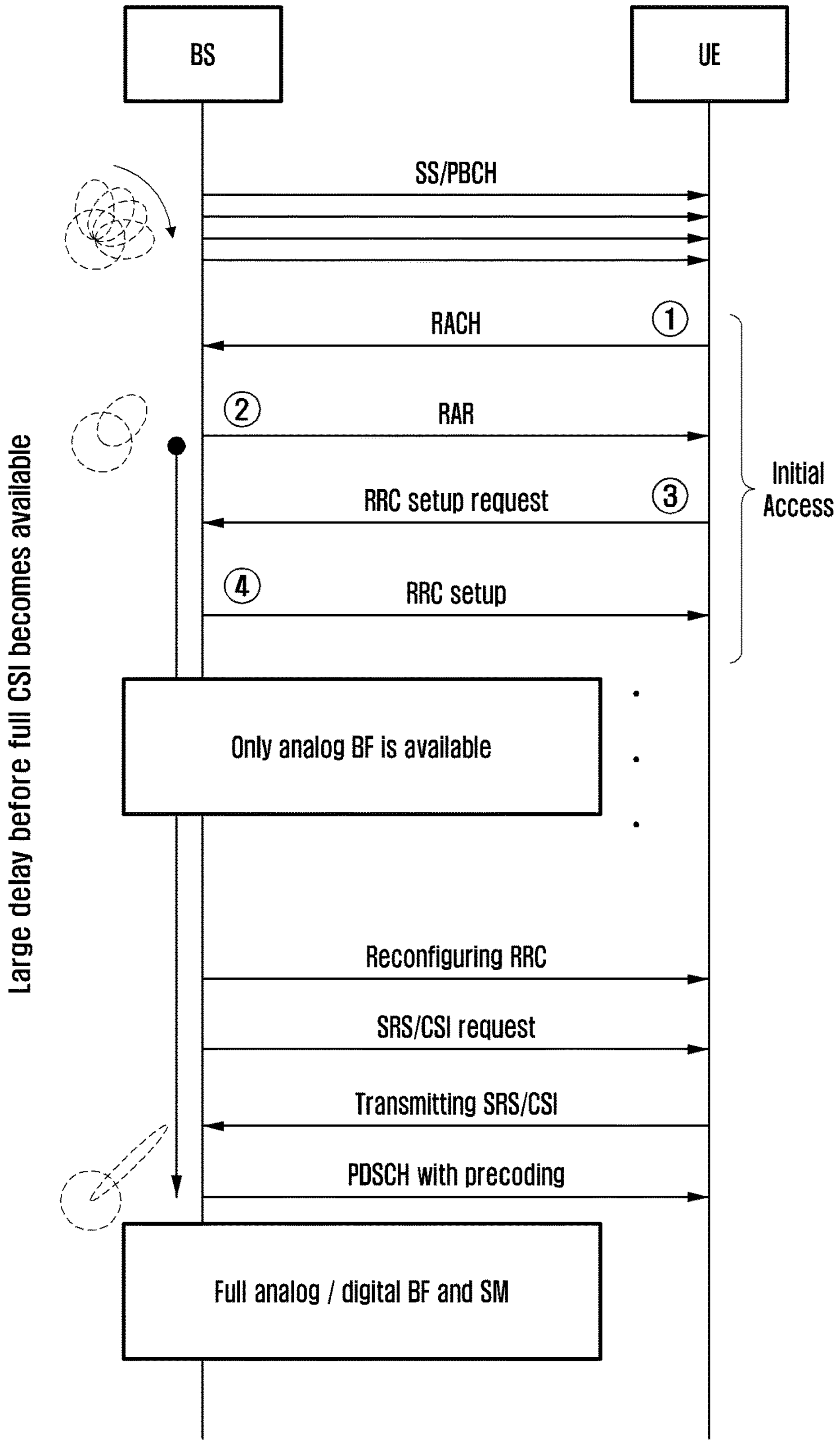
FIG. 1 (Related Art)
FIG. 1 illustrates a flow of signals transmitted between a BS and a UE for acquiring a CSI according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of this disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each method flow chart unit or any combination of such units may be implemented via computer program instructions. These instructions may be provided to a processor of a general-purpose computer, a special-purpose computer, or other programmable data processing apparatus to provide a component/device that, when executed, operates as a means for implementing functions specified in the method flow chart block or blocks. Such computer program instructions may be stored on a computer-used or computer-readable medium (e.g., in a memory).

In addition, each method flow chart unit may represent a module, segment or part of a code that includes one or multiple executable instructions for implementing a certain logical function(s). It should also be noted that in some alternative implementations, functions specified in the units may not be executed in the order in which they are indicated in the figures and described in the specification. Two units shown sequentially, for example, may actually be executed substantially concurrently, or sometimes the units may be executed in the reverse order depending on the desired functionality.

When a device is described herein, the term "unit" may refer to a program element or a hardware element of such a device, for example, to a Field Programmable Gate Array (FPGA), an Application-Specific Integrated Circuit (ASIC), a System on Chip (SoC), or at least to a certain portion of the foregoing components that perform a certain function or a set of functions. However, the "unit" does not always have a value limited to software or hardware. The "unit" can be constructed either for storage on an addressable storage medium, or for execution by one or more processors. Thus, the "unit" includes, for example, software elements, object-oriented software elements, class or task elements, processes, functions, properties, procedures, routines, program code segments, drivers, firmware, microcodes, circuits, data, database, data structures, tables, arrays, and parameters. Two or more "units" may be combined into a single "unit" or a single "unit" may be divided into two or more "units." In addition, the "unit" in the embodiments may include one or more processors.

In the disclosure, Uplink (UL) refers to a radio link over which a UE transmits a data or a control signal to a BS, and Downlink (DL) refers to a radio link over which a BS transmits a data or a control signal to a UE. In addition, the BS is an entity that allocates a resource to the UE, and may be one of a transmit/receive point (Transmission/Reception Point) serving cells, eNode B, Node B, gNode B, a radio access unit, a base station controller, and a node in a network. The UE may include a user terminal, a mobile station (MS), a cell phone, a smartphone, a computer, or a media system configured to perform a communication function.

6G system operating in the upper-middle frequency band (10-12 GHZ) will support the use of large spatial signal encoding antenna arrays (Multiple Input Multiple Output, MIMO, ≥1024 antenna elements) with hybrid analog and digital beamforming with a large number of antenna ports (≥128) in a Base Station (BS). The awareness of the BS about channel state information (CSI) is essential to provide all performance-influencing communication advantages of the MIMO consisting in a beamforming that allows a transmit power for a signal to be steered into a desired direction, and in Spatial Multiplexing (SM) that allows the same time and frequency resource to be reused for transmitting a plurality of signals to the same User Equipment (UE) or to different UE.

The lack of CSI makes transmission from the BS highly inefficient because the lack of the CSI associated with analog beamforming is usually compensated by the beam sweeping operation across all available analog beams in the BS. In addition, the lack of the CSI associated with digital beamforming, that is referred to as precoding/spatial processing in the alternative terminology, is usually compensated by a more reliable transmission of physical channels with a lower modulation order and a coding rate that excessively consumes time and frequency resources.

FIG. 1 illustrates a flow of signals transmitted between a BS and a UE for acquiring a CSI according to the related art.

The problems described above are illustrated referring to FIG. 1 schematically showing an initial network communication procedure used in related art (IA—in the illustrated case), defined in the 5G NR specification (see, e.g., TS 38,213). During the procedure, acquisition of a partial CSI only is provided, allowing the best analog beam only to be selected when the limited BF is performed. Such a partial CSI is indicated for the BS using a Random Access Channel (RACH) transmission. Thus, the procedure used in the related art suffers from a significant delay in acquisition of a full CSI for downlink (DL) precoding. More specifically, referring to FIG. 1, acquiring a full CSI, i.e., the CSI related also to digital precoding, occurs with a significant delay (after the IA procedure, a 'non-access medium signaling layer' procedure (Non Access Stratum, NAS), a Radio Resource Control (RRC) connection reconfiguration procedure) that cause the system to operate inefficiently over a relatively long period of time. Hence, until the full CSI is acquired, transmission over DL according to the related art is performed in a highly suboptimal manner, with a low Signal-to-Noise Ratio (SNR, due to lack of digital precoding), without spatial multiplexing, with increased interference for the UEs served by other BSs, with low spectral transmission efficiency, etc.

A U.S. Pat. No. 11,368,978 B2 (Samsung Electronics Co., Ltd) published on 21 Jun. 2022, in which a technology of managing a random access channel configuration in a wireless communication system is disclosed, is known from related art. The technology provides for the capability of early acquisition of a CSI only associated with analog beamforming, but does not support CSI acquisition for digital precoding. Hence, in the patent described technology, a DL transmission is still performed in a suboptimal manner.

Figure 2:
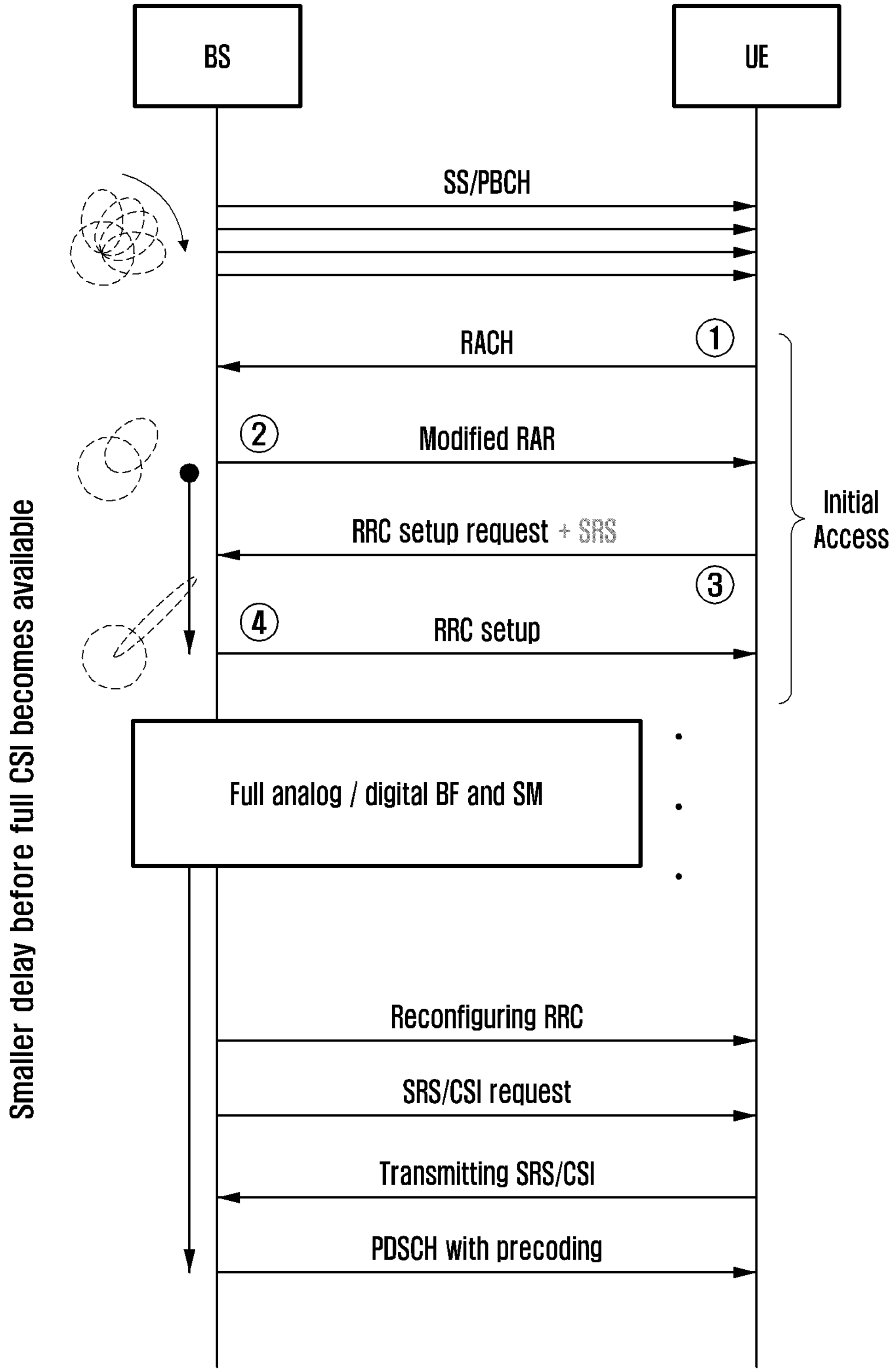
FIG. 2 illustrates a flow of signals transmitted between a BS and a UE for acquiring a CSI according to an embodiment of the disclosure.

FIG. 2 illustrates a flow of signals transmitted between BS and UE for acquiring a CSI according to an embodiment of the disclosure. Early CSI acquisition during an IA procedure is illustrated in FIG. 2. Nevertheless, the disclosure should not be limited merely by the use during the IA procedure, since it is equally applicable during a different communication procedure in a network such as, but not limited to, a handover procedure, a radio link failure recovery procedure, or a beam failure detection and recovery procedure.

While operating, the BS emits, using a beam sweeping operation, a plurality of Synchronization Signal/Physical Broadcast Channel (SS/PBCH) units in the surrounding space. The SS/PBCH unit usually includes a Primary Synchronization Signal (PSS), a Secondary Synchronization Signal (SSS), a PBCH, and its Demodulation Reference Signal (DMRS).

Once the UE is being in the coverage area of the BS and detects the SS/PBCH unit emitted by it, the UE transmits, at operation S100 (FIG. 7), a random access preamble to the BS within (via) a PRACH. The random access preamble transmitted in the PRACH informs the BS about the intention of the UE being in the coverage area of the BS to access the BS. The random access preamble transmitted within the PRACH may be alternately referred to, including in the specification of the Standard (see, e.g., TS 38.213), as 'Msg1.'

At operation S200 (FIG. 8), the BS receives the random access preamble transmitted from the UE within the PRACH, that preamble allows the BS to estimate at least a time delay of the random access preamble between the BS and the UE, as well as an approximate distance to the UE. In response to receiving the random access preamble, the BS generates the modified (enhanced) RAR, and, at operation S205 (FIG. 8), transmits the modified RAR to the UE within the PDSCH. Herein, the RAR is referred to as 'modified' one because it further includes a new SRS request field whose value indicates whether the UE should transmit the SRS, and optionally a new SRS Transmission Power Control (TPC) field whose value indicates a transmit power for the SRS. In another embodiment, a new 'SRS Resource Allocation' field may be provided in the modified RAR, in which the uplink resource or resources and any other SRS related parameters (including a new 'SRS Request' field and optionally a new 'SRS TPC' field) and appropriate values to be used for transmitting the SRS are indicated. The structure and content of possible, non-limiting embodiments of the modified RAR implementation will be described in detail below referring to FIGS. 3 and 4.

The RAR transmitted within the PRACH may be alternately referred to, including in the specification of the Standard (see, e.g., TS 38.213), as 'Msg2.' At least estimation of the random access preamble previously performed by the BS at operation S200 (FIG. 8) allows determining at least some parameters and appropriate parameter values to be included in the modified RAR, and also providing transmission of the modified RAR by using an analog beamforming of a transmit antenna to said UE. How exactly the parameters and values of corresponding parameters to be included in the RAR are determined, and how exactly the analog beamforming is implemented are predetermined in the specification of the currently existing Standard (see, e.g., TS 38.213) or may be predetermined in a specification of any other communication standard to be developed in the future (e.g., in a specification or modification of the Standard related to the sixth generation (6G) communication technology).

At operation S105 (FIG. 7), the UE receives, within the PDSCH, the modified RAR comprising said SRS request field whose value indicates whether the UE should transmit the SRS. Due to this, already at this step, the UE can determine, having referred to the value indicated in the SRS request field, whether the SRS should be transmitted to the BS. The SRS is a reference signal transmitted by the UE in a UL direction, the signal used by the BS to estimate a channel status of the uplink in a wider bandwidth, and from one or multiple antennas of the UE, or from one or multiple antenna ports of the UE. The BS may use the resulting CSI estimation for resource-selective scheduling the UL. Optionally, if more than one bit is reserved and used for said value indicated in the SRS request field, said value further indicates a predetermined configuration of the SRS of a predetermined set of configurations of the SRS. The non-limiting examples of predetermined values and possible variants of predetermined configurations of the SRS will be described in detail below with references to Tables 1 to 3 and FIGS. 5A to 5D and 6A to 6E.

When the SRS request field value in the modified RAR received from the BS indicates that the UE should transmit the SRS, the UE at operation S110 (FIG. 7) transmits, within a Physical Uplink Shared Channel (PUSCH), the SRS together with a RRC setup request to the BS. PUSCH transmission with the RRC setup request may be alternatively referred to, including in the specification of the Standard (see, e.g., TS 38.213), as 'Msg3.' The RRC connection is a connection set up according to a RRC protocol that is a control plane protocol and is a system of algorithms and instructions used to provide the UE with access to a radio interface and to implement a radio resource control strategy in a communication network. When the SRS request field value in the modified RAR received from the BS indicates that the UE should not transmit the SRS, the UE may not transmit the SRS at operation S110 (i.e., in other words, skip transmitting the SRS). In this case, the UE may transmit, within the PUSCH, the RRC setup request or any other PUSCH signal only to the BS.

Main functions that can be implemented through the RRC protocol include, but are not limited to, (1) broadcasting an AS (Access Stratum—a signaling layer related to an access medium and existing on a site between the UE and the BS) system information and/or a NAS (Non-Access Stratum—a signaling layer not related to an access medium and existing on a site between the UE and an Access and Mobility Management Function (AMF)), (2) transmitting paging messages of the UE, (3) setting up, supporting and disconnecting a RRC connection between the UE and the BS in a Radio Access Network (RAN), (4) managing a carrier aggregation, (5) managing a Dual Connectivity (DC) mode, i.e. the simultaneous connection of the UE to two BS (including two BS of different generations), (6) managing virtual Signaling Radio Bearers (SRBs) and virtual Data Radio Bearers (DRBs), (7) managing mobility (handover, cell selection parameters and radio access technology), (8) managing Quality of Service (QOS) parameters, (9) controlling the UE to perform radio measurements and reporting, (10) detecting a radio link failure and recovering the radio link, (11) performing the tasks associated with safety, etc.

The SRS at operation S110 may be transmitted over at least a portion of one or more Physical Resource Blocks (PRBs) scheduled in the modified RAR for PUSCH transmission. The bandwidth of 1 PRB is 180 kHz, 360 kHz, 720 kHz or 1.44 MHz depending on a Subcarrier Spacing (SCS) used, which in the 5G NR communication systems may take the values of 15 kHz, 30 kHz, 60 kHz and 120 kHz, respectively. One PRB consists of 12 successive subcarriers occupying said bandwidth, and one time slot (6 or 7 symbols of Orthogonal Frequency-Division Multiplexing (OFDM)). In the 5G NR communication systems, the slot duration is 1 ms for the subcarrier spacing being of 15 kHz. For large SCS values (30 kHz, 60 kHz, 120 kHz), the slot duration is shortened to 0.5 ms, 0.25 ms, and 0.125 ms, respectively. One PRB is usually the smallest resource allocation (grant) element designated by the BS planner. Each OFDM symbol on each of the subcarriers forms a Resource Element (RE), which is defined by a pair of values {k, l}, where k is a subcarrier number, l is a symbol number in a slot. In some situations, the subcarrier, slot, OFDM symbol, or even RE may also be considered and used as a resource distribution/allocation element.

The SRS at operation S110 may be transmitted in a subset of OFDM symbols of one or multiple PUSCH slots that are scheduled in the modified RAR for PUSCH transmission, for example, transmitting the RRC setup request within the PUSCH. In this case, said subset of OFDM symbols and the one or multiple PUSCH slots, or the RE subset corresponding thereto, may be indicated in the modified RAR. A configuration of the transmitted SRS may correspond to a predetermined configuration of the SRS of a predetermined set of configurations of the SRS that is signaled by a value indicated in the SRS request field when at least two bits are reserved and used for the value.

In response to receiving, from the UE, the RRC setup request, the BS together with the SRS performs, based on the received SRS, an uplink channel state estimation from the UE for acquiring a CSI, and sets up a RRC connection between the UE and the BS. The acquired CSI comprises, but is not limited to, a Rank Indicator (RI) providing a referral rank recommendation to be used or, in other way, a number of MIMO layers (spatial MIMO subchannels) that are preferably to be used for transmitting over the DL to the UE. According to the technology disclosed in the application, a spatial processing precoder of the BS and/or a Modulation and Coding Scheme (MCS) are calculated based on measurements of the SRS.

In one non-limiting example, a channel matrix can be estimated from the received SRS signals, and then, for the precoder, eigenvectors of the channel matrix corresponding to the main eigenvalues can be used. In other non-limiting examples, the precoder for MU-MIMO can be computed on the basis of a Minimum Mean Square Error (MMSE) or a maximum of a Signal-to-Leakage-and-Noise Ratio (SLNR). In yet another non-limiting example, the precoder for MU-MIMO can be computed using a Zero Forcing (ZF) technique. The MCS, in a non-limiting example, may be selected according to a SNR ratio for the UE obtained by estimation at the side of the BS. This estimation is conducted using a BS calculated precoding, a channel matrix estimation obtained by the BS based on measurements of the SRS, and a noise and interference level information at the side of the UE that can be obtained from the CQI.

How exactly the uplink channel state estimation is conducted and what particularly is included in the CSI is predetermined in the specification of the currently existing Standard (see e.g. TS 38.213) or may be predetermined in a specification of any other communication standard to be developed in the future (e.g., in a specification or modification of the Standard related to the sixth generation (6G) communication technology).

Once the CSI is acquired, the BS may perform at one or more subsequent S215 operations one or multiple subsequent downlink transmissions to the UE with adaptive spatial signal processing performed on the basis of the acquired CSI. In addition, once the CSI is acquired, the BS may transmit the acquired CSI to the UE to perform also the adaptive spatial processing of any signal transmitted from the UE to the BS. The adaptive spatial signal processing includes at least hybrid analog and digital beamforming and SM. As the analog beamforming, digital beamforming, and SM procedures (see, e.g., Section 7.3.1.3 of the TS 38.211 Specification) as such are known from related art, their detailed description is not given here to provide the accuracy and brevity of description of particulars of namely the disclosure.

Any subsequent transmission from the BS to the UE over the PDSCH may be performed with contention resolution between the transmissions, and any of such contention resolution transmissions may be alternately referred to, including in the specification of the Standard, as 'Msg4.' A non-limiting example of one or multiple subsequent downlink transmissions to the UE with adaptive spatial signal processing is PDSCH transmission for setting up a RRC connection to the UE. Setting up the RRC connection to the UE may include setting up at least one SRB and/or at least one DRB. Other non-limiting examples of one or multiple subsequent downlink transmissions to the UE with adaptive spatial signal processing are transmission for reconfiguring the RRC connection, transmission for the SRS/CSI request, CSI transmission, or transmission of any other data or service signals over the PDSCH.

Figure 7:
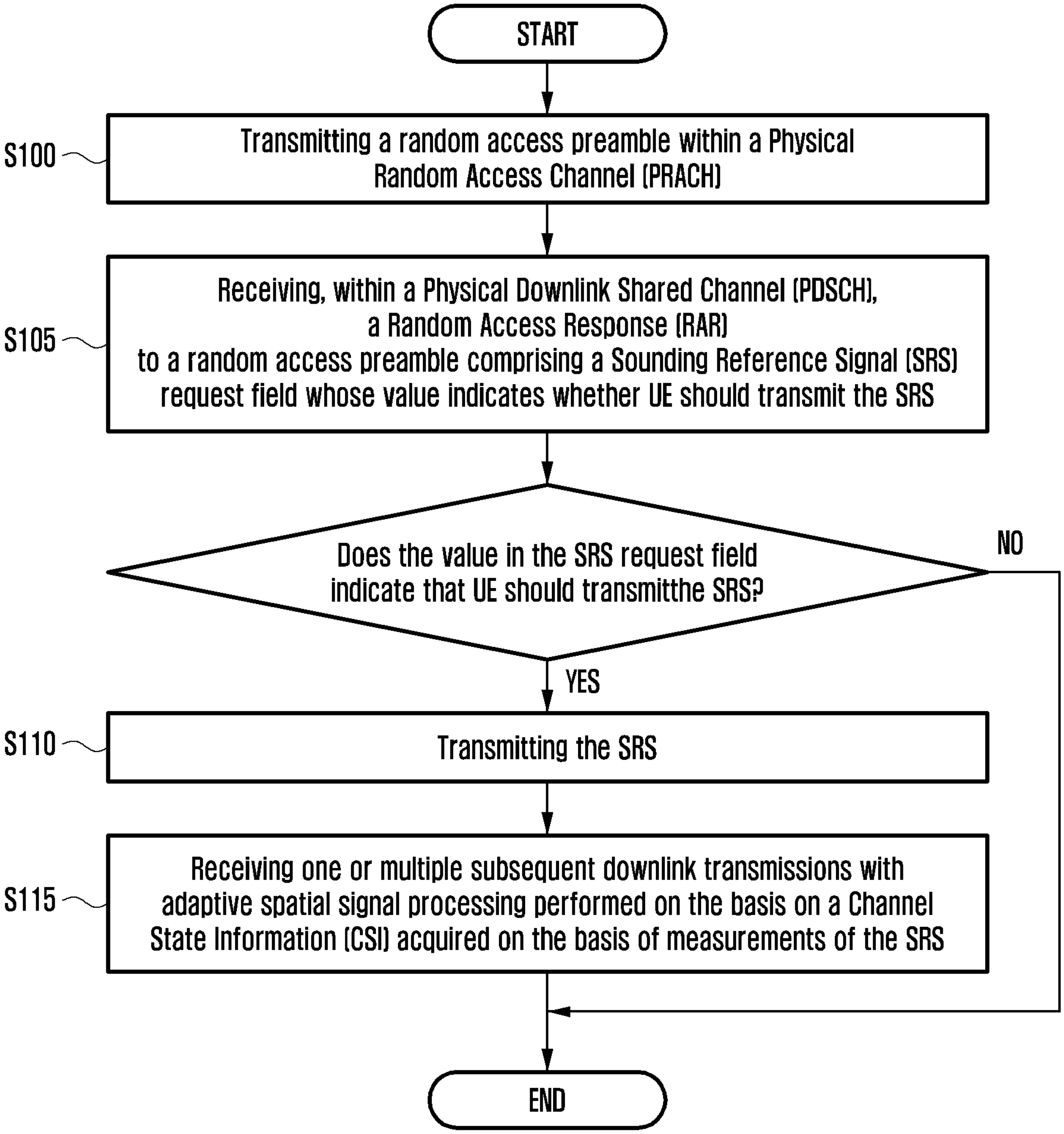
FIG. 7 illustrates a flow chart of a communication method performed by a UE during a network communication procedure according to an embodiment of the disclosure.
Figure 8:
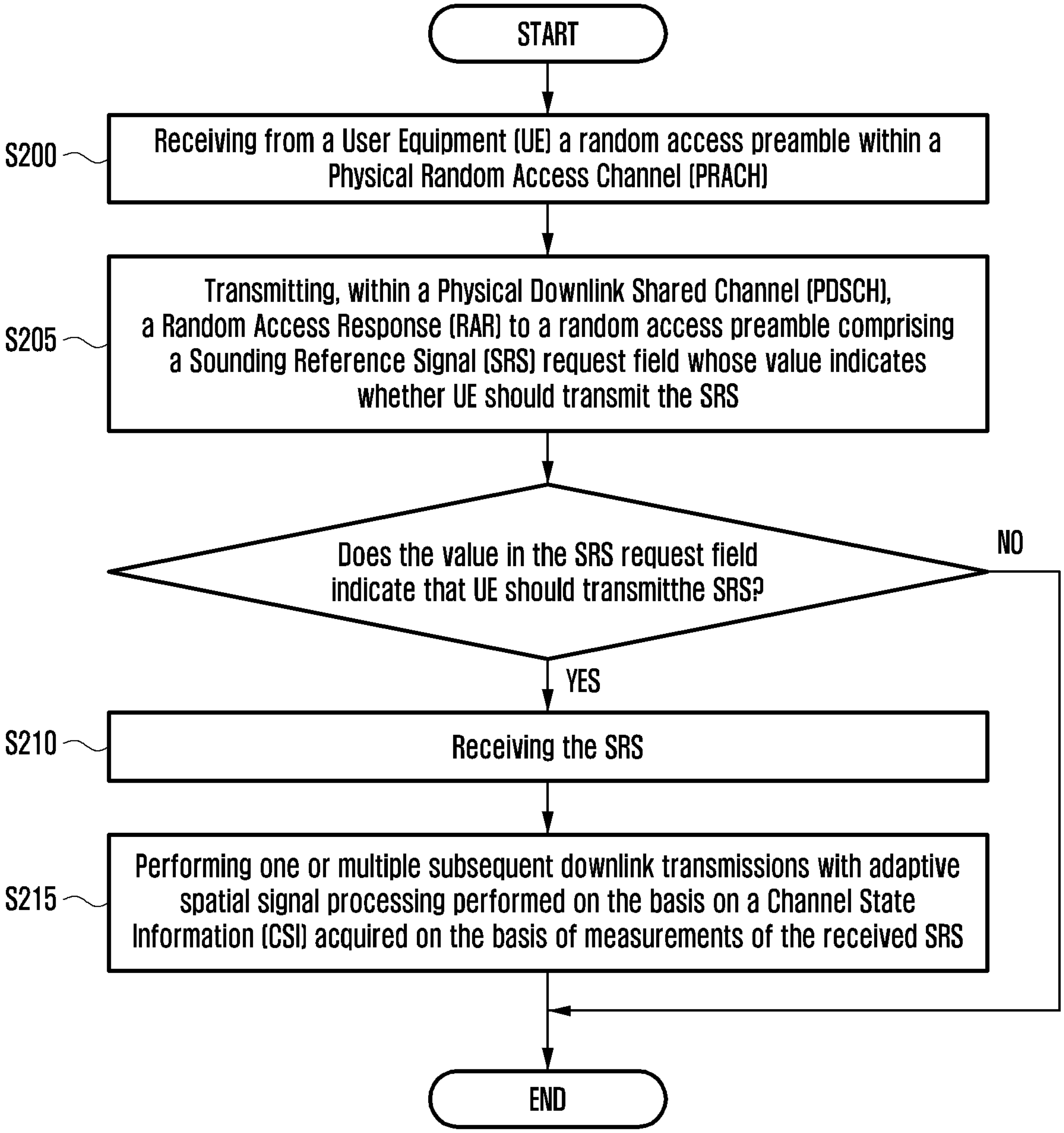
FIG. 8 illustrates a flow chart of a communication method performed by a BS during a network communication procedure according to an embodiment of the disclosure.

In turn, the UE at operation S115 receives the one or multiple subsequent downlink transmissions from the BS with adaptive spatial signal processing performed on the basis of the CSI acquired due to measurements of the SRS performed at the side of the BS. Thus, the communication between the BS and the UE may be performed with adaptive spatial signal processing (i.e. in an optimal manner) starting from the operation S215 described above. In other words, the disclosure provides a smaller delay before the moment when the full CSI is available, with all the ensuing technical advantages, one of which is a quicker transition to adaptive spatial processing of any signals (including service signals and data) transmitted between the BS and the UE. FIGS. 7 and 8 show sequences of the basic communication methods described above and performed by the UE and by the BS, respectively, during the network communication procedure.

Figure 3:
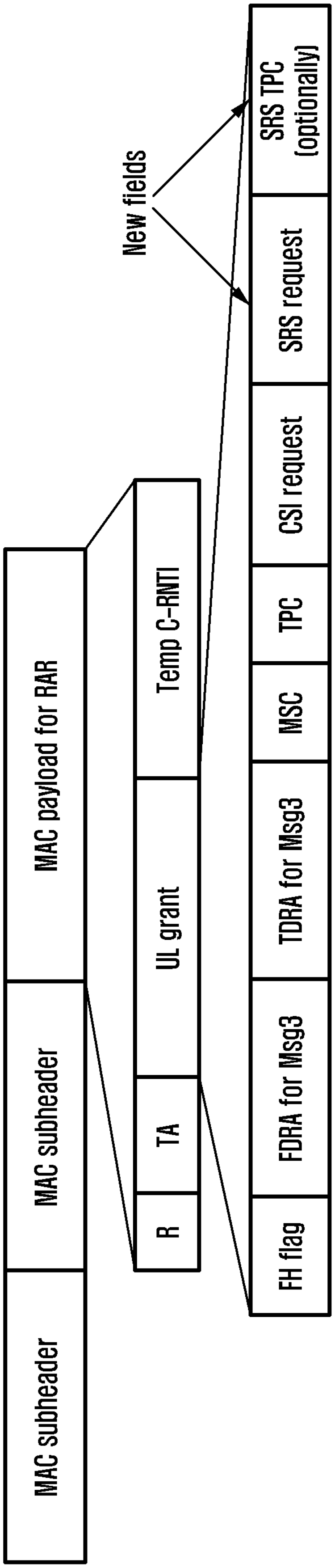
FIG. 3 illustrates a structure and content of a modified RAR according to an embodiment of the disclosure.

FIG. 3 illustrates a structure and content of a modified RAR ('Msg2') according to an embodiment of the disclosure.

As indicated above, this message is transmitted at operation S205 from the BS to the UE. FIG. 3 shows a relevant part of a Protocol Data Unit (PDU). The upper level may include one or more Medium Access Control (MAC) subheaders, and the MAC payload for the RAR. The MAC payload for the RAR may include, at the average level of the structure shown in FIG. 3, but not limited to, (1) a reserved bit (R) usually set to be equal to 0, (2) a Timing Advance (TA) command field in which an index value of the TA used for shifting the start of transmitting a UE signal in uplink, the shifting performed to compensate for the signal propagation time to the BS, is indicated, (3) a UL resource allocation field in which the uplink resource or resources to be used for transmission (e.g., for transmitting 'Msg3') are indicated, and (4) a Cell Radio Network Temporary Identifier (C-RNTI) field that is used by the MAC entity during a random access.

The UL grant field may include, at the lower level of the structure shown in FIG. 3, a new SRS request field whose value indicates whether the UE should transmit the SRS, and optionally a new SRS TPC field whose value indicates a transmit power for the SRS. In addition, the UL grant field may include, at the lower level of the structure shown in FIG. 3, but not limited to, one or more of the following: (1) a Frequency Hopping (FH) flag, if the FH flag value is set to be equal to 0, the UE transmits the PUSCH without the FH, otherwise (the FH flag='1') the UE transmits the PUSCH with the FH, (2) a Frequency Domain Resource Allocation (FDRA) field to transmit over the PUSCH, (3) a Time Domain Resource Allocation (TDRA) field to transmit over the PUSCH, (4) a Modulation and Coding Scheme (MCS) field to transmit over the PUSCH, (5) a TPC field in which a value of the TPC command for setting a power for transmitting over the PUSCH is indicated, and (6) a CSI request field whose value indicates whether the CSI should to be transmitted.

According to one possible implementation, when the SRS request field value indicates that the UE should transmit the SRS (e.g., the SRS request field='1') but the SRS TPC field is not comprised in the received RAR, the SRS is transmitted at a power indicated (e.g., in the form of index in the set of predetermined transmit power values) for transmitting over the PUSCH in the TPC field described above (see the field (5) described above). The values of the flag (1) and fields (2)-(6) and/or the methods for their determination may be predetermined in the specification of the currently existing Standard (see e.g. TS 38.213) or may be predetermined in a specification of any other communication standard to be developed in the future (e.g., in a specification or modification of the Standard related to the sixth generation (6G) communication technology.

Figure 4:
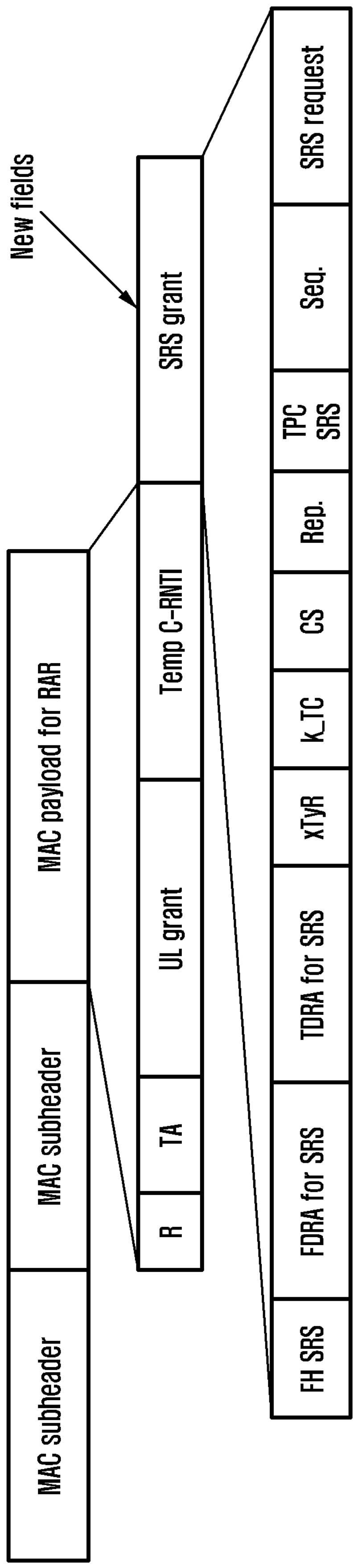
FIG. 4 illustrates a structure and content of a modified RAR according to an embodiment of the disclosure.

FIG. 4 illustrates a structure and content of the modified RAR according to an embodiment of the disclosure, which provides capabilities of a more flexible setting for transmitting the SRS than in the embodiment shown in FIG. 3. The following description of FIG. 4 is made with focus on main differences from the embodiment illustrated and described above with reference to FIG. 3.

Referring to FIG. 4, the MAC payload for the RAR further includes, at the average level of the structure shown in FIG. 4, a new further SRS grant (resource allocation) field in which the uplink resource or resources to be used for transmission (e.g., transmitting the SRS) are indicated.

The SRS grant field may include, at the lower level of the structure shown in FIG. 4, a new SRS request field whose value indicates whether the UE should transmit the SRS, and optionally a new SRS TPC field whose value indicates a power for transmitting the SRS. In addition, the UL grant field may include, at the lower level of the structure shown in FIG. 4, but not limited to, one or more of the following: (1) A FH flag for transmitting the SRS, if the FH flag value is set to be equal to 0, the UE transmits the SRS without the FH, otherwise (the FH SRS flag='1'), the UE transmits the SRS with the FH, (2) a FDRA field for the SRS for transmitting the SRS, (3) a TDRA field for the SRS for transmitting the SRS, (4) a xTyR field indicating the UE's antenna switching capabilities, a specific value of the xTyR parameter corresponds to the UE capable of transmitting the SRS over 'x' antenna ports from the total number of 'y' antennas, wherein 'y' corresponds to all receive antennas of the UE or to their subset, (5) a k_TC (Transmission Comb) field indicates a group of subcarriers for the SRS forming a 'comb' shape, i.e., a group of equidistant subcarriers distributed uniformly across the entire bandwidth, (6) a Cyclic Shift (CS) field indicating a cyclic shift of the SRS, (7) a SRS repetition (Seq) field in which it is indicated whether the UE should repeat transmitting the SRS, and (8) a sequence field in which a signal sequence for the SRS (e.g., the Zadoff-Chu (ZC) root sequence) is indicated. The values of the flag (1) and fields (2)-(6) and/or the methods for their determination may be predetermined in the specification of the currently existing Standard (see e.g. TS 38.213) or may be predetermined in a specification of any other communication standard to be developed in the future (e.g., in a specification or modification of the Standard related to the sixth generation (6G) communication technology.

Let is consider, in detail, the possible specific variants of bit values of the SRS request field and the non-limiting configurations of the SRS with reference to Tables 1 to 3 and FIGS. 5A to 5D and 6A to 6E.

TABLE 1

Single bit SRS request field

| SRS request field value | Description |
|---|---|
| 0 | No SRS is transmitted |
| 1 | SRS is transmitted |

TABLE 2

Two bits SRS request field

| SRS request field value | Description |
|---|---|
| 00 | No SRS is transmitted |
| 01 | SRS is transmitted with a first predetermined configuration of the SRS |
| 10 | SRS is transmitted with a second predetermined configuration of the SRS |
| 11 | SRS is transmitted with a third predetermined configuration of the SRS |

TABLE 3

Three bits SRS request field

| SRS request field value | Description |
|---|---|
| 000 | No SRS is transmitted |
| 001 | SRS is transmitted with a first predetermined configuration of the SRS |
| 010 | SRS is transmitted with a second predetermined configuration of the SRS |
| 011 | SRS is transmitted with a third predetermined configuration of the SRS |
| 100 | SRS is transmitted with a fourth predetermined configuration of the SRS |
| 101 | SRS is transmitted with a fifth predetermined configuration of the SRS |
| 110 | SRS is transmitted with a sixth predetermined configuration of the SRS |
| 111 | SRS is transmitted with a seventh predetermined configuration of the SRS |

As seen from the above Tables 1 to 3, the capability of determining one or another configuration of the SRS by a value of the SRS request field appears only when said value comprises not less than two bits. In other words, when a value of the SRS request field comprises one bit, transmitting the SRS is signaled merely with one predetermined configuration of the SRS. It should be understood that the specific bit values and what they signal (i.e., what is indicated in the column 'Description' in Tables 1 to 3 above) may be predetermined otherwise. In addition, it should be understood that which particular configuration of the SRS is assumed by one or another particular predetermined configuration of the SRS may be predetermined in the specification of the currently existing Standard (see e.g. TS 38.213) or may be predetermined in a specification of any other communication standard to be developed in the future (e.g., in a specification or modification of the Standard related to the sixth generation (6G) communication technology). The "predetermined configuration of the SRS" as such may include any configuration that may be signaled by the content of the 'SRS request' field and optionally the SRS TPC field described above with reference to FIG. 3, or by the content of the 'SRS grant' field described above with reference to FIG. 4, and by the content of any flags/fields included at the lower level of the structure shown in FIG. 4 in the 'SRS grant' field.

FIGS. 5A, 5B, 5C, and 5D, and FIGS. 6A, 6B, 6C, 6D, and 6E illustrate non-limiting embodiments of configurations of the SRS predetermined by values of the SRS request field according to various embodiments of the disclosure.

Figure 5A:
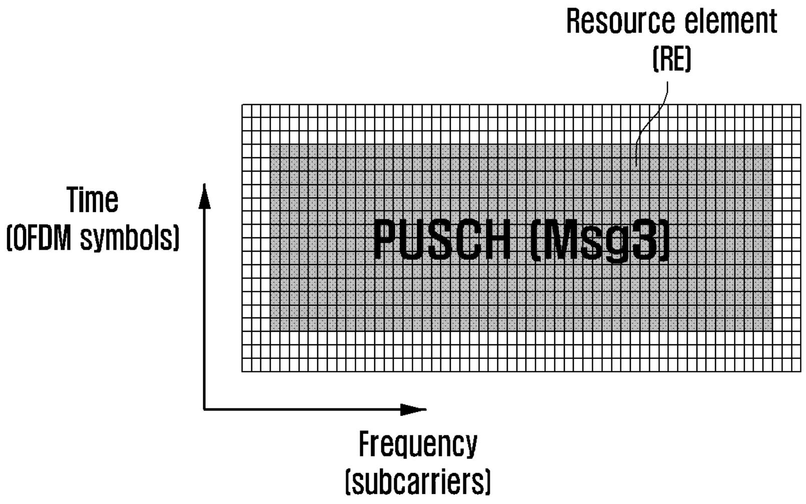
FIG. 5A illustrates a non-limiting embodiment of configurations of an SRS predetermined by values of the SRS request field according to an embodiment of the disclosure.
Figure 5B:
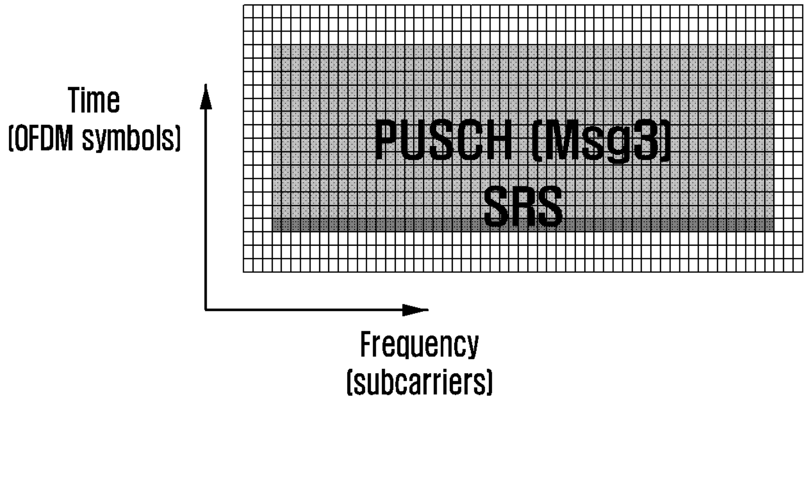
FIG. 5B illustrates a non-limiting embodiment of configurations of an SRS predetermined by values of the SRS request field according to an embodiment of the disclosure.
Figure 5C:
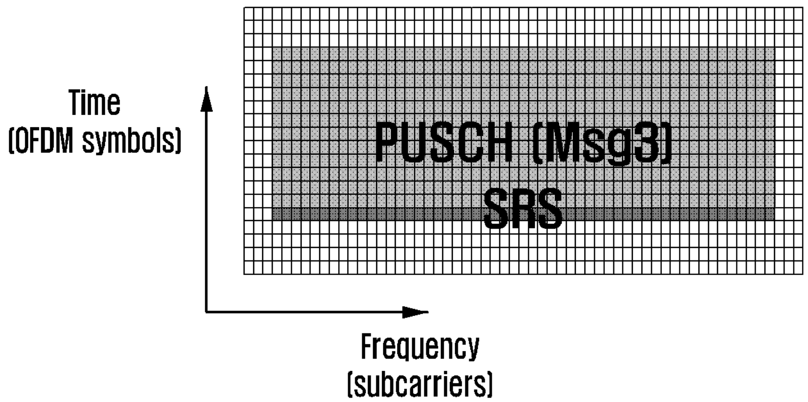
FIG. 5C illustrates a non-limiting embodiment of configurations of an SRS predetermined by values of the SRS request field according to an embodiment of the disclosure.
Figure 5D:
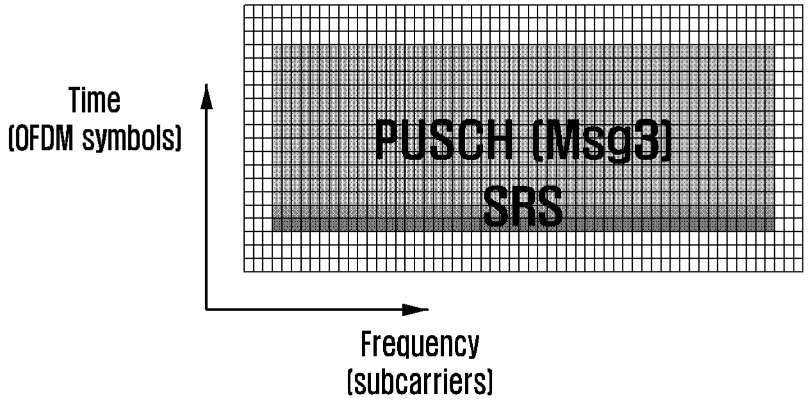
FIG. 5D illustrates a non-limiting embodiment of configurations of an SRS predetermined by values of the SRS request field according to an embodiment of the disclosure.

FIG. 5A illustrates a variant of transmitting over the PUSCH (Msg3) without transmitting the SRS when the request field value signals that no SRS is transmitted. The value '00' of the SRS request field may correspond to such a configuration. FIG. 5B illustrates a variant of transmitting over the PUSCH (Msg3) with transmitting the SRS performed, if the time domain is concerned, in the last OFDM symbol of the PUSCH. The value '01' of the SRS request field may correspond to such a configuration. FIG. 5C illustrates a variant of transmitting over the PUSCH (Msg3) with transmitting the SRS performed, if the time domain is concerned, in the next-to-last OFDM symbol of the PUSCH. The value '10' of the SRS request field may correspond to such a configuration. FIG. 5D illustrates a variant of transmitting over the PUSCH (Msg3) with transmitting several SRS instances (e.g., from different antenna ports of the UE) performed, if the time domain is concerned, in the last and next-to-last OFDM symbols of the PUSCH. The value '11' of the SRS request field may correspond to such a configuration. The configuration shown in FIG. 5D allows initiating the transmission of different SRS instances by different antenna ports or the UE antennas to provide a more accurate antenna-dependent CSI estimation by the BS. It should be noted that the positions of the OFDM symbols for the SRS may be counted from boundaries of an uplink slot, and configurations of the SRS, as indicated above, may be predetermined otherwise (including other parameters, e.g., using a group of subcarriers, cyclic shift, etc.) or combined with each other.

Figure 6A:
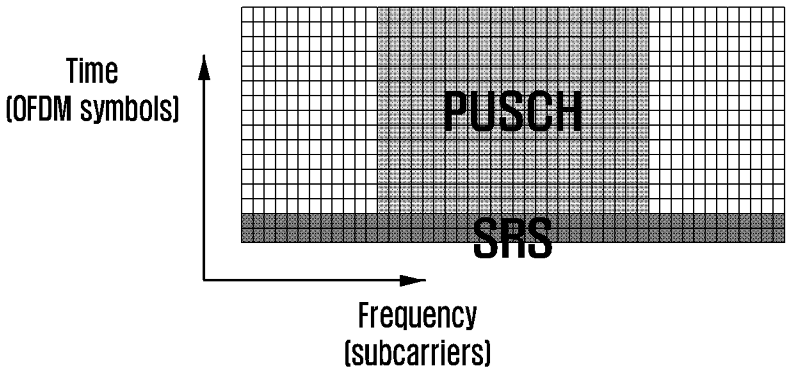
FIG. 6A illustrates a non-limiting embodiment of configurations of an SRS predetermined by values of the SRS request field according to an embodiment of the disclosure.
Figure 6B:
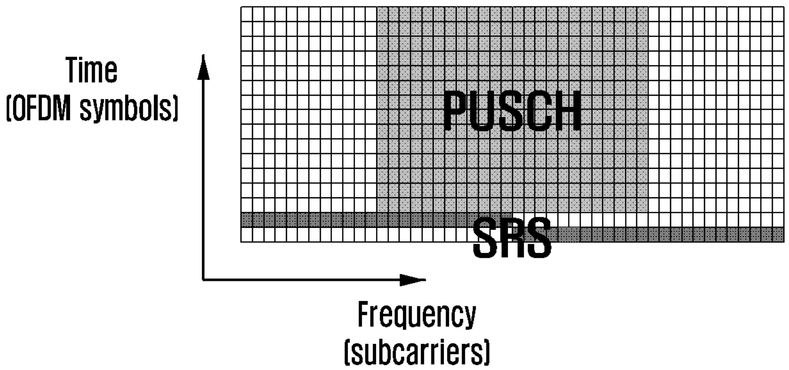
FIG. 6B illustrates a non-limiting embodiment of configurations of an SRS predetermined by values of the SRS request field according to an embodiment of the disclosure.
Figure 6C:
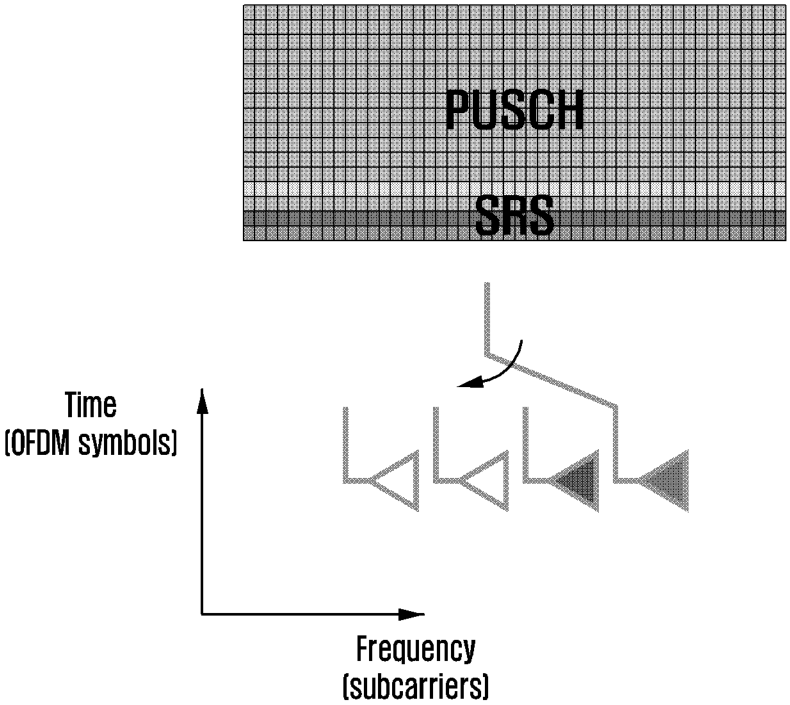
FIG. 6C illustrates a non-limiting embodiment of configurations of an SRS predetermined by values of the SRS request field according to an embodiment of the disclosure.

FIG. 6A illustrates a variant of transmitting over the PUSCH (Msg3) with transmitting multiple SRS instances performed with indication of a particular frequency domain resource for transmitting the SRS in the FDRA field. The advantage of this configuration of the SRS is the capability of sounding certain PRBs. FIG. 6B illustrates a variant of transmitting over the PUSCH (Msg3) with transmitting multiple SRS instances performed with using the FH for transmitting the SRS. The advantage of this configuration of the SRS is the increased accuracy of the CSI estimation due to increasing the SRS power. FIG. 6C illustrates a variant of transmitting over the PUSCH (Msg3) with transmitting multiple SRS instances performed with indication of xTyR for transmitting the SRS through a certain number of receive antennas. The channel estimation technique is based on a channel reciprocity, i.e. measurements of the SRS in the UL allow the pre-encoding for transmitting a signal in a DL to be calculated, assuming that the DL and UL channel is reciprocal. Since the UE is capable of transmitting, as a rule, from a small number of antennas only (e.g., from one antenna only, i.e., 1T), in practice, a technique for switching between the receive antennas of the UE (e.g., between 4 antennas, i.e. 4R) may be employed to transmit the SRS. Thus, in the non-limiting example, the xTyR configuration may be 1T4R. The advantage of this configuration of the SRS is the capability of acquiring a further CSI for more effective precoding the transmissions over the DL.

Figure 6D:
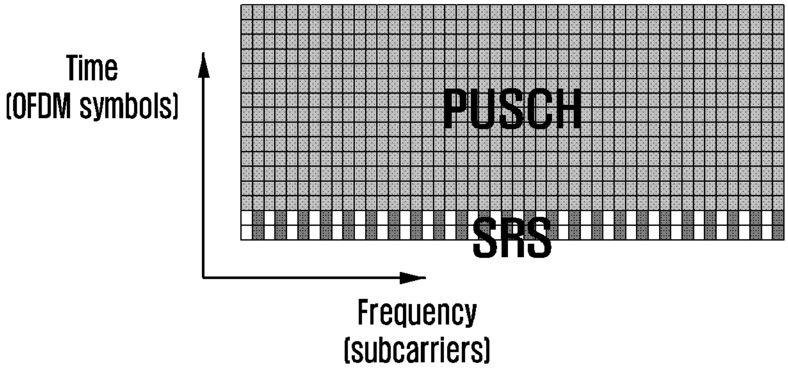
FIG. 6D illustrates a non-limiting embodiment of configurations of an SRS predetermined by values of the SRS request field according to an embodiment of the disclosure.
Figure 6E:
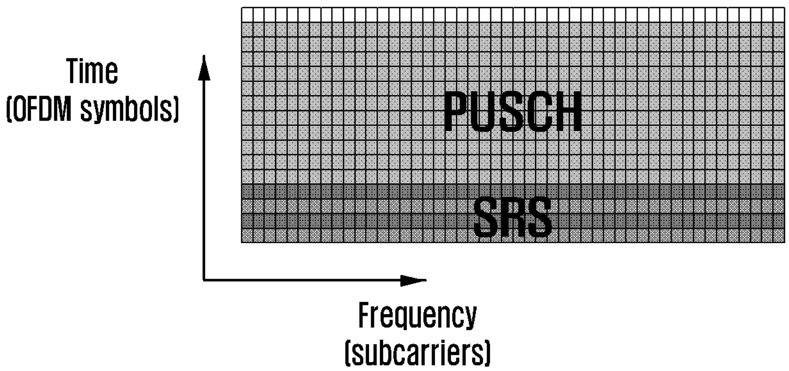
FIG. 6E illustrates a non-limiting embodiment of configurations of an SRS predetermined by values of the SRS request field according to an embodiment of the disclosure.

FIG. 6D illustrates a variant of transmitting over the PUSCH (Msg3) with transmitting multiple SRS instances performed with indication of k_TC, CS, Seq for transmitting the multiple SRS instances. The advantage of this configuration of the SRS is the capability of simpler multiplexing if there are other UEs transmitting the SRS. FIG. 6E illustrates a variant of transmitting over the PUSCH (Msg3) with transmitting the multiple SRS instances performed multiple times (i.e., with repeating). The advantage of this configuration of the SRS is the increased accuracy of the CSI estimation due to the possibility of multiple processing the SRS in the BS. It should be noted that configurations of the SRS, as indicated above, may be predetermined otherwise or combined with each other.

The disclosure also provides (1) a UE communicating in a communication network, the UE configured to perform the communication method in accordance with the first aspect of the disclosure or in accordance with any further implementation of the first aspect of the disclosure, (2) a BS communicating in a communication network, the BS configured to perform the communication method in accordance with the third aspect of the disclosure or in accordance with any further implementation of the third aspect of the disclosure, and (3) a communication system comprising a plurality of UEs and a plurality of BSs, wherein said plurality of UEs and said plurality of BSs are configured to communicate with each other in this communication system. As various hardware configurations of the UE and the BS that may be used to implement the communication method in accordance with any aspect of the disclosure or in accordance with any further implementation of such any aspect of the disclosure are known from related art, their detailed description is not given herein.

In one non-limiting implementation of the UE according to the disclosure, the UE may include, among other traditional software (e.g., an operating system, etc.) and hardware components (e.g., a screen, an input/output (I/O) interface, a power source, etc.), a transmit unit (e.g., an antenna) configured to transmit a random access preamble within a PRACH, a receive unit (e.g., an antenna) configured to receive a RAR within a PDSCH, the RAR comprising a SRS request field whose value indicates whether the UE should transmit the SRS, a determination unit (e.g., a processor or another computing means) configured to determine, based on a value of the SRS request field, whether the UE should transmit the SRS. In the case if the determination unit determines that the UE should transmit the SRS, said transmit unit available in the UE may be further configured to transmit the SRS, and said receive unit available in the UE may be further configured to receive one or multiple subsequent downlink transmissions with adaptive spatial signal processing performed by the BS on the basis of the CSI acquired on the basis of measurements of the SRS. Some of the above-mentioned units may be combined into a smaller number of units, for example, the receive unit and the transmit unit may be combined into a transceiver unit, etc.

In one non-limiting implementation of the BS according to the disclosure, the BS may include, among other traditional software (e.g., an operating system, etc.) and hardware components (e.g., a screen, an input/output (I/O) interface, a power source, etc.), a receive unit (e.g., an antenna) configured to receive, from the UE, a random access preamble within a PRACH, a transmit unit (e.g., an antenna) configured to transmit a RAR within a PDSCH, the RAR comprising a SRS request field whose value indicates whether the UE should transmit the SRS, a determination and indication unit (e.g., a processor or another computing means) configured to (i) determine whether the UE should transmit the SRS based on one or more criteria (e.g., but not limited to, the criteria associated with the random access preamble or with the quality of its reception at the side of the BS) and (ii) indicate, based on said determination, a corresponding value in the SRS request field (to be included in the RAR transmitted to the UE), a CSI estimation unit (e.g., a processor or another computing means) configured to acquire a CSI based on measurements of the SRS received from the UE, and an adaptive signal spatial processing unit (e.g., a processor or another computing means) configured to perform adaptive spatial processing of any signal to be transmitted to the UE based on the CSI acquired on the basis of measurements of the SRS received from the UE. Accordingly, the transmit unit may be further configured to perform one or multiple subsequent downlink transmissions with adaptive spatial signal processing based on the CSI acquired on the basis of measurements of the received SRS. Some of the above-mentioned units may be combined into a smaller number of units, for example, the receive unit and the transmit unit may be combined into a transceiver unit, etc.

The technical advantages of the disclosure is, depending on the embodiment, at least one of the following: early CSI acquisition during the IA procedure (i.e., acquiring a full CSI with a lower delay), that provides the capability of earlier digital precoding in the BS; the capability of use (operating) during other network communication procedures: a handover procedure, a radio link failure recovery procedure, or beam failure detection and recovery procedure; a more effective subsequent DL transmission, i.e., an enhanced signal-noise ratio of the signal received in the UE, support for multiple MIMO layers per each UE, support of multi-user and/or massive MIMO, extended cell coverage, reduced undesired interference to the UEs in other cells.

FIG. 7 illustrates a flowchart of a communication method performed by a User Equipment (UE) during a network communication procedure according to an embodiment of the disclosure.

According to an embodiment, the method may include transmitting, at operation S100, a random access preamble within a Physical Random Access Channel (PRACH).

According to an embodiment, the method may include receiving at operation S105, within a Physical Downlink Shared Channel (PDSCH), a Random Access Response (RAR) to the random access preamble comprising a Sounding Reference Signal (SRS) request field whose value indicates whether the UE should transmit the SRS.

According to an embodiment, the method may include if the SRS request field value indicates that the UE should transmit the SRS, transmitting, at operation S110, the SRS.

According to an embodiment, the method may include receiving, at operation S115, one or multiple subsequent downlink transmissions with adaptive spatial signal processing performed on the basis of a Channel State Information (CSI) acquired on the basis of measurements of the SRS.

According to an embodiment, the network communication procedure may be an initial access procedure, a handover procedure, a radio link failure recovery procedure, or a beam failure detection and recovery procedure.

According to an embodiment, the received RAR may further include an SRS Transmit Power Control (TPC) field whose value indicates a transmit power for the SRS.

According to an embodiment, if the SRS request field value indicates that the UE should transmit the SRS but the SRS TPC field is not comprised in the received RAR, the SRS may be transmitted at a power indicated for a Physical Uplink Shared Channel (PUSCH).

According to an embodiment, the SRS may be transmitted together with a Radio Resource Control (RRC connection) setup request.

According to an embodiment, if the SRS request field value indicates that the UE should transmit the SRS, the value may further indicate a predetermined configuration of the SRS.

According to an embodiment, if the SRS request field value indicates that the UE should not transmit the SRS, the RRC setup request only may be transmitted.

According to an embodiment, the SRS may be transmitted to a portion of Physical Resource Blocks (PRBs) scheduled by the RAR for PUSCH transmission.

According to an embodiment, the received RAR may include indication of a PRB for transmitting the SRS.

According to an embodiment, the SRS and the RRC setup request within PUSCH may be transmitted at a transmit power whose value is indicated in the TPC field in the received RAR.

According to an embodiment, the received RAR may further include a TPC field of the RRC setup request whose value indicates a transmit power for the RRC setup request.

According to an embodiment, the power value indicated in the SRS TPC field may be different from the power value indicated in the RRC setup request TPC field.

According to an embodiment, the SRS may be transmitted within the same PUSCH slot as the RRC setup request is transmitted.

According to an embodiment, the received RAR may include indication of a slot for the SRS.

According to an embodiment, the received RAR may include indication of symbols in the slot for the SRS.

According to an embodiment, the SRS may be transmitted from one or multiple antennas of the UE, wherein a number of the UE antennas used for transmitting the SRS is indicated in the received RAR.

According to an embodiment, the received RAR may include indication of a group of subcarriers for the SRS.

According to an embodiment, the received RAR may include indication of a cyclic shift for the SRS.

According to an embodiment, the received RAR may include indication of a signal sequence for the SRS.

According to an embodiment, one or multiple SRS parameters defining the SRS may be predetermined in a standard specification.

According to an embodiment, a User Equipment (UE) for communicating in a communication network may be provided.

According to an embodiment, the UE may be configured to perform the communication method according any one of the embodiments.

FIG. 8 illustrates a flowchart of a communication method performed by a Base Station (BS) during a network communication procedure according to an embodiment of the disclosure.

According to an embodiment, the method may include receiving at operation S200 from a User Equipment (UE) a random access preamble within a Physical Random Access Channel (PRACH).

According to an embodiment, the method may include transmitting at operation S205, within a Physical Downlink Shared Channel (PDSCH), a Random Access Response (RAR) to the random access preamble comprising a Sounding Reference Signal (SRS) request field whose value indicates whether the UE should transmit the SRS.

According to an embodiment, the method may include if the SRS request field value indicates that the UE should transmit the SRS, receiving, at operation S210, the SRS.

According to an embodiment, the method may include performing, at operation S215, one or multiple subsequent downlink transmissions with adaptive spatial signal processing performed on the basis of a Channel State Information (CSI) acquired on the basis of measurements of the received SRS.

According to an embodiment, wherein the network communication procedure may be an initial access procedure, a handover procedure, a radio link failure recovery procedure, or a beam failure detection and recovery procedure.

According to an embodiment, the transmitted RAR may further include an SRS Transmit Power Control (TPC) field whose value indicates a transmit power for the SRS.

According to an embodiment, if the SRS request field value indicates that the UE should transmit the SRS but the SRS TPC field is not comprised in the transmitted RAR, the SRS may be received at a power indicated for a Physical Uplink Shared Channel (PUSCH).

According to an embodiment, the SRS may be received together with a Radio Resource Control (RRC connection) setup request.

According to an embodiment, if the SRS request field value indicates that the UE should transmit the SRS, the value may further indicate a predetermined configuration of the SRS.

According to an embodiment, if the SRS request field value indicates that the UE should not transmit the SRS, the RRC setup request only may be received.

According to an embodiment, the SRS may be received on a portion of Physical Resource Blocks (PRBs) scheduled by the RAR for PUSCH transmission.

According to an embodiment, the transmitted RAR may include indication of a PRB for transmitting the SRS.

According to an embodiment, the SRS and the RRC setup request within PUSCH may be received at a power whose value is indicated in the TPC field in the transmitted RAR.

According to an embodiment, the transmitted RAR may further include a TPC field of the RRC setup request whose value indicates a transmit power for the RRC setup request.

According to an embodiment, the power value indicated in the SRS TPC field may be different from the power value indicated in the RRC setup request TPC field.

According to an embodiment, the SRS may be received within the same PUSCH slot as the RRC setup request is received.

According to an embodiment, the transmitted RAR may include indication of a slot for the SRS.

According to an embodiment, the transmitted RAR may include indication of symbols in the slot for the SRS.

According to an embodiment, the SRS may be received from one or multiple antennas of the UE, wherein a number of the UE antennas used for transmitting the SRS is indicated in the transmitted RAR.

According to an embodiment, the transmitted RAR may include indication of a group of subcarriers for the SRS.

According to an embodiment, the transmitted RAR may include indication of a cyclic shift for the SRS.

According to an embodiment, the transmitted RAR may include indication of a signal sequence for the SRS.

According to an embodiment, one or multiple SRS parameters defining the SRS may be predetermined in a standard specification.

According to an embodiment, a Base Station (BS) for communicating with a User Equipment (UE) in a communication network may be provided.

According to an embodiment, the BS may be configured to perform the communication method according to any one of embodiments.

According to an embodiment, a communication system including a plurality of the User Equipments (UEs) according to an embodiment and a plurality of the Base Stations (BSs) according to an embodiment may be provided.

According to an embodiment, the plurality of UEs and the plurality of BSs may be configured to communicate with each other in the communication system.

Figure 9:
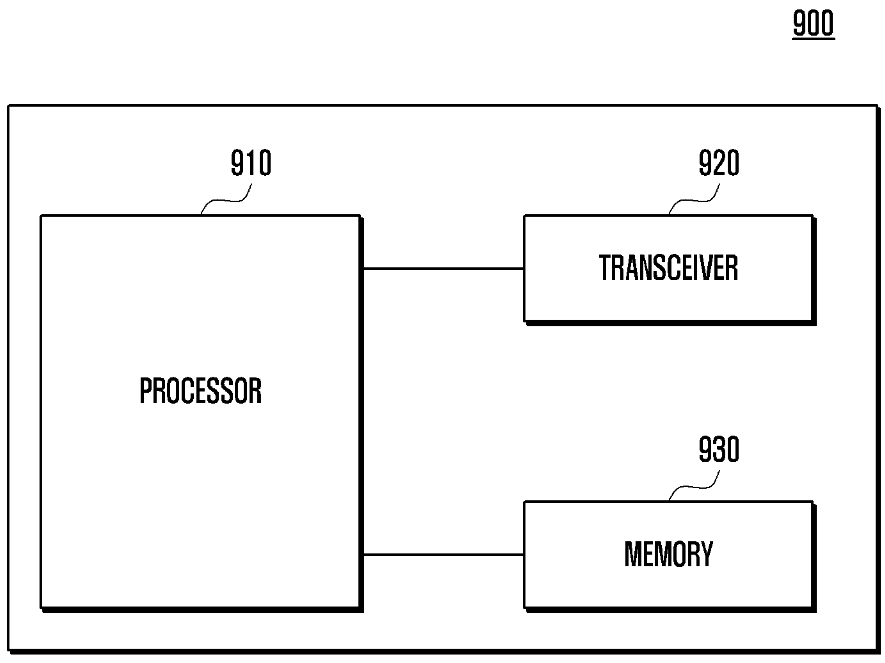
FIG. 9 illustrates an electronic device according to an embodiment of the disclosure.

FIG. 9 illustrates an electronic device according to an embodiment of the disclosure.

Referring to FIG. 9, the electronic device 900 may include a processor 910, a transceiver 920 and a memory 930. However, all of the illustrated components are not essential. The electronic device 900 may be implemented by more or less components than those illustrated in FIG. 9. In addition, the processor 910 and the transceiver 920 and the memory 930 may be implemented as a single chip according to another embodiment.

The electronic device 900 may correspond to the UE described above.

The aforementioned components will now be described in detail.

The processor 910 may include one or more processors or other processing devices that control the proposed function, process, and/or method. Operation of the electronic device 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the electronic device 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or compact disc (CD)-ROM and/or digital versatile disc (DVD) and/or other storage devices.

Figure 10:
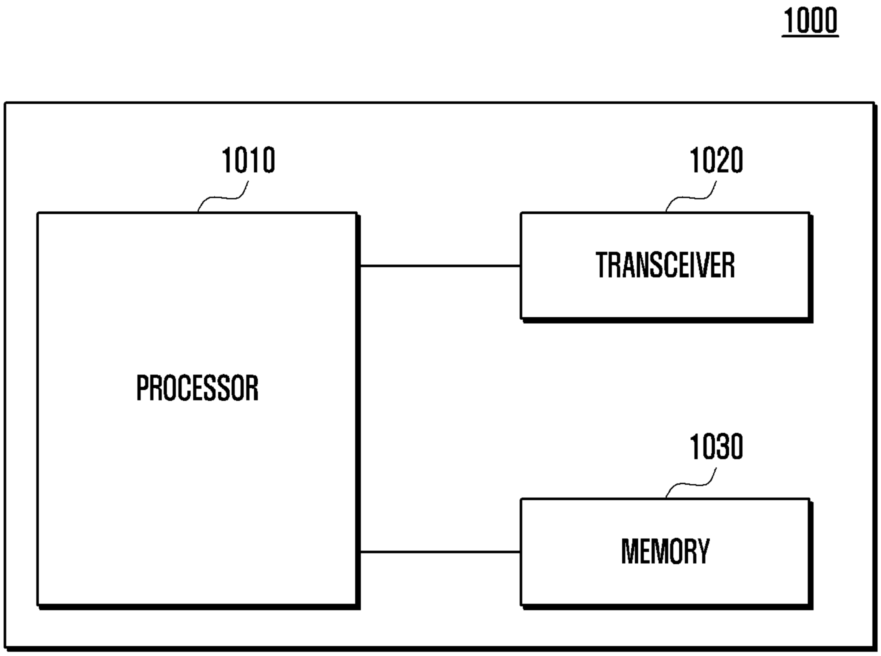
FIG. 10 illustrates a base station according to an embodiment of the disclosure.

FIG. 10 illustrates a base station according to an embodiment of the disclosure.

Referring to FIG. 10, the base station 1000 may include a processor 1010, a transceiver 1020 and a memory 1030. However, all of the illustrated components are not essential. The base station 1000 may be implemented by more or less components than those illustrated in FIG. 10. In addition, the processor 1010 and the transceiver 1020 and the memory 1030 may be implemented as a single chip according to another embodiment.

The base station 1000 may correspond to the gNB described above.

The aforementioned components will now be described in detail.

The processor 1010 may include one or more processors or other processing devices that control the proposed function, process, and/or method. Operation of the base station 1000 may be implemented by the processor 1010.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the base station 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

INDUSTRIAL APPLICABILITY

The disclosure can be used in a BS employing a massive MIMO antenna technology with a very high number of digital antenna ports (e.g., ≥128). The disclosure can be deployed to operate in an upper part of a medium frequency band (10-12 GHz), but can be used in other frequency bands, can support the operation in a Time Division Duplex (TDD), and can comply with the 3rd Generation Partnership Project (3GPP) specification. In addition, the disclosure can be used in a wireless system employing advanced transmission schemes with multiple MIMO layers per UE and BS.

While the disclosure has been shown and described with reference to various embodiments thereof, it will be understood by those skilled in the art that various changes in form and details may be made therein without departing from the spirit and scope of this disclosure as defined by the appended claims and their equivalents.

What is claimed is:

1. A method performed by a user equipment (UE) in a communication system, the method comprising:

transmitting a random access preamble on a physical random access channel (PRACH);

receiving, on a physical downlink shared channel (PDSCH), a random access response (RAR) associated with the random access preamble, wherein the RAR includes a transmit power control (TPC) field, a sounding reference signal (SRS) request field and an SRS TPC field, wherein a value of the TPC field indicates a transmit power for a radio resource control (RRC) connection setup request, a value of the SRS request field indicates whether to transmit the SRS and a value of the SRS TPC field indicates a transmit power for the SRS, and wherein the value of the SRS TPC field is different from the value of the TPC field;

in case that the value of the SRS request field is one bit and indicates to transmit the SRS, transmitting the SRS using the transmit power indicated by the SRS TPC field;

in case that the value of the SRS request field is two bits or three bits and indicates a predetermined configuration of the SRS among a plurality of predetermined configurations, transmitting the SRS based on the predetermined configuration indicated by the SRS request field using the transmit power indicated by the SRS TPC field; and receiving one or multiple subsequent downlink transmissions with adaptive spatial signal processing based on channel state information (CSI) associated with measurements of the SRS.

2. The method according to claim 1, wherein the method is performed during at least one of an initial access procedure, a handover procedure, a radio link failure recovery procedure, or a beam failure detection and recovery procedure.

3. The method according to claim 1, wherein the SRS is transmitted on a portion of physical resource blocks (PRBs) scheduled by the RAR for PUSCH transmission.

4. A method performed by a base station (BS) in a communication system, the method comprising:

receiving, from a user equipment (UE), a random access preamble on a physical random access channel (PRACH);

transmitting, to the UE, on a physical downlink shared channel (PDSCH), a random access response (RAR) associated with the random access preamble, wherein the RAR includes a transmit power control (TPC) field, a sounding reference signal (SRS) request field and an SRS TPC field, wherein a value of the TPC field indicates a transmit power for a radio resource control (RRC) connection setup request, a value of the SRS request field indicates whether to transmit the SRS and a value of the SRS TPC field indicates a transmit power for the SRS, and wherein the value of the SRS TPC field is different from the value of the TPC field;

in case that the value of the SRS request field is one bit and indicates to transmit the SRS, receiving the SRS transmitted by the UE with the transmit power indicated by the SRS TPC field;

in case that the value of the SRS request field is two bits or three bits and indicates a predetermined configuration of the SRS among a plurality of predetermined configurations, receiving the SRS based on the predetermined configuration indicated by the SRS request field with the transmit power indicated by the SRS TPC field; and performing one or multiple subsequent downlink transmissions with adaptive spatial signal processing performed based on a channel state information (CSI) obtained based on measurements of the received SRS.

5. The method according to claim 4, wherein the method is performed during at least one of an initial access procedure, a handover procedure, a radio link failure recovery procedure, or a beam failure detection and recovery procedure.

6. The method according to claim 4, wherein the SRS is received on a portion of physical resource blocks (PRBs) scheduled by the RAR for physical uplink shared channel (PUSCH) transmission.

7. A user equipment (UE) in a communication system, the UE comprising:

a transceiver; and a processor coupled with the transceiver and configured to:

transmit a random access preamble on a physical random access channel (PRACH), receive, on a physical downlink shared channel (PDSCH), a random access response (RAR) associated with the random access preamble, wherein the RAR includes a transmit power control (TPC) field, a sounding reference signal (SRS) request field and an SRS TPC field, wherein a value of the TPC field indicates a transmit power for a radio resource control (RRC) connection setup request, a value of the SRS request field indicates whether to transmit the SRS and a value of the SRS TPC field indicates a transmit power for the SRS, and wherein the value of the SRS TPC field is different from the value of the TPC field, in case that the value of the SRS request field is one bit and indicates to transmit the SRS, transmit the SRS using the transmit power indicated by the SRS TPC field, in case that the value of the SRS request field is two bits or three bits and indicates a predetermined configuration of the SRS among a plurality of predetermined configurations, transmit the SRS based on the predetermined configuration indicated by the SRS request field using the transmit power indicated by the SRS TPC field, and receive one or multiple subsequent downlink transmissions with adaptive spatial signal processing based on channel state information (CSI) associated with measurements of the SRS.

8. The UE of claim 7, wherein the UE is operated in a network communication procedure, wherein the network communication procedure is an initial access procedure, a handover procedure, a radio link failure recovery procedure, or a beam failure detection and recovery procedure.

9. The UE of claim 7, wherein the SRS is transmitted on a portion of physical resource blocks (PRBs) scheduled by the RAR for PUSCH transmission.

10. A base station (BS) in a communication system, the BS comprising:

a transceiver; and a processor coupled with the transceiver and configured to:

receive, from a user equipment (UE), a random access preamble on a physical random access channel (PRACH), transmit, to the UE, on a physical downlink shared channel (PDSCH), a random access response (RAR) associated with the random access preamble, wherein the RAR includes a transmit power control (TPC) field, a sounding reference signal (SRS) request field and an SRS TPC field, wherein a value of the TPC field indicates a transmit power for a radio resource control (RRC) connection setup request, a value of the SRS request field indicates whether to transmit the SRS and a value of the SRS TPC field indicates a transmit power for the SRS, and wherein the value of the SRS TPC field is different from the value of the TPC field, in case that the value of the SRS request field is one bit and indicates to transmit the SRS, receive the SRS transmitted by the UE with the transmit power indicated by the SRS TPC field, in case that the value of the SRS request field is two bits or three bits and indicates a predetermined configuration of the SRS among a plurality of predetermined configurations, receive the SRS based on the predetermined configuration indicated by the SRS request field with the transmit power indicated by the SRS TPC field, and perform one or multiple subsequent downlink transmissions with adaptive spatial signal processing performed based on a channel state information (CSI) obtained based on measurements of the received SRS.

11. The BS according to claim 10, wherein the BS is operated in a network communication procedure, wherein the network communication procedure is an initial access procedure, a handover procedure, a radio link failure recovery procedure, or a beam failure detection and recovery procedure.

12. The BS according to claim 10, wherein the SRS is received on a portion of physical resource blocks (PRBs) scheduled by the RAR for physical uplink shared channel (PUSCH) transmission.

* * * * *